(12) United States Patent
Widener

(10) Patent No.: US 8,529,195 B2
(45) Date of Patent: Sep. 10, 2013

(54) INDUCER FOR GAS TURBINE SYSTEM

(75) Inventor: Stanley Kevin Widener, Greenville, SC (US)

(73) Assignee: General Electric Company, Schenectady, NY (US)

(*) Notice: Subject to any disclaimer, the term of this patent is extended or adjusted under 35 U.S.C. 154(b) by 455 days.

(21) Appl. No.: 12/902,699

(22) Filed: Oct. 12, 2010

(65) Prior Publication Data

US 2012/0087784 A1 Apr. 12, 2012

(51) Int. Cl.
*F01D 5/08* (2006.01)

(52) U.S. Cl.
USPC ........... 415/115; 415/116; 415/180; 415/145; 415/169.1; 415/176

(58) Field of Classification Search
USPC .............. 415/115, 116, 180, 144, 145, 169.1, 415/175, 176
See application file for complete search history.

(56) References Cited

U.S. PATENT DOCUMENTS

| | | | |
|---|---|---|---|
| 3,602,605 A | 8/1971 | Lee et al. | |
| 4,466,239 A | 8/1984 | Napoli et al. | |
| 4,674,955 A | 6/1987 | Howe et al. | |
| 4,708,588 A | 11/1987 | Schwarz et al. | |
| 4,807,433 A | 2/1989 | Maclin et al. | |
| 4,882,902 A | 11/1989 | Reigel et al. | |
| 5,245,821 A | 9/1993 | Thomas, Jr. et al. | |
| 5,575,616 A * | 11/1996 | Hagle et al. | 415/115 |
| 5,984,630 A | 11/1999 | Di Salle et al. | |
| 6,050,079 A | 4/2000 | Durgin et al. | |
| 6,183,193 B1 * | 2/2001 | Glasspoole et al. | 415/115 |
| 6,234,746 B1 * | 5/2001 | Schroder et al. | 415/115 |
| 6,413,044 B1 | 7/2002 | Roeloffs et al. | |
| 6,468,032 B2 * | 10/2002 | Patel | 415/115 |
| 6,540,477 B2 * | 4/2003 | Glynn et al. | 415/115 |
| 6,923,005 B2 | 8/2005 | Casoni | |
| 7,110,565 B1 | 9/2006 | Engbert et al. | |
| 2009/0232637 A1 * | 9/2009 | Propheter-Hinckley et al. | 415/116 |

FOREIGN PATENT DOCUMENTS

| | | |
|---|---|---|
| EP | 0926315 | 6/1999 |
| EP | 1074694 | 2/2001 |
| EP | 1890005 | 2/2008 |
| EP | 2011968 | 1/2009 |

* cited by examiner

*Primary Examiner* — Edward Look
*Assistant Examiner* — William Grigos
(74) *Attorney, Agent, or Firm* — Dority & Manning, PA

(57) ABSTRACT

An inducer for a casing of a gas turbine system is disclosed. The inducer includes a plurality of orifices defined in the casing, the plurality of orifices disposed in an annular array about the casing, and a plurality of cartridges, each of the plurality of cartridges configured to mate with one of the plurality of orifices. Each of the plurality of cartridges includes an inlet and an outlet for flowing a cooling medium therethrough. The inducer further includes at least one flow modifier disposed in each of the plurality of cartridges for modifying the flow of the cooling medium through each of the plurality of cartridges. Each of the plurality of cartridges is independently removable from each of the plurality of orifices.

20 Claims, 6 Drawing Sheets

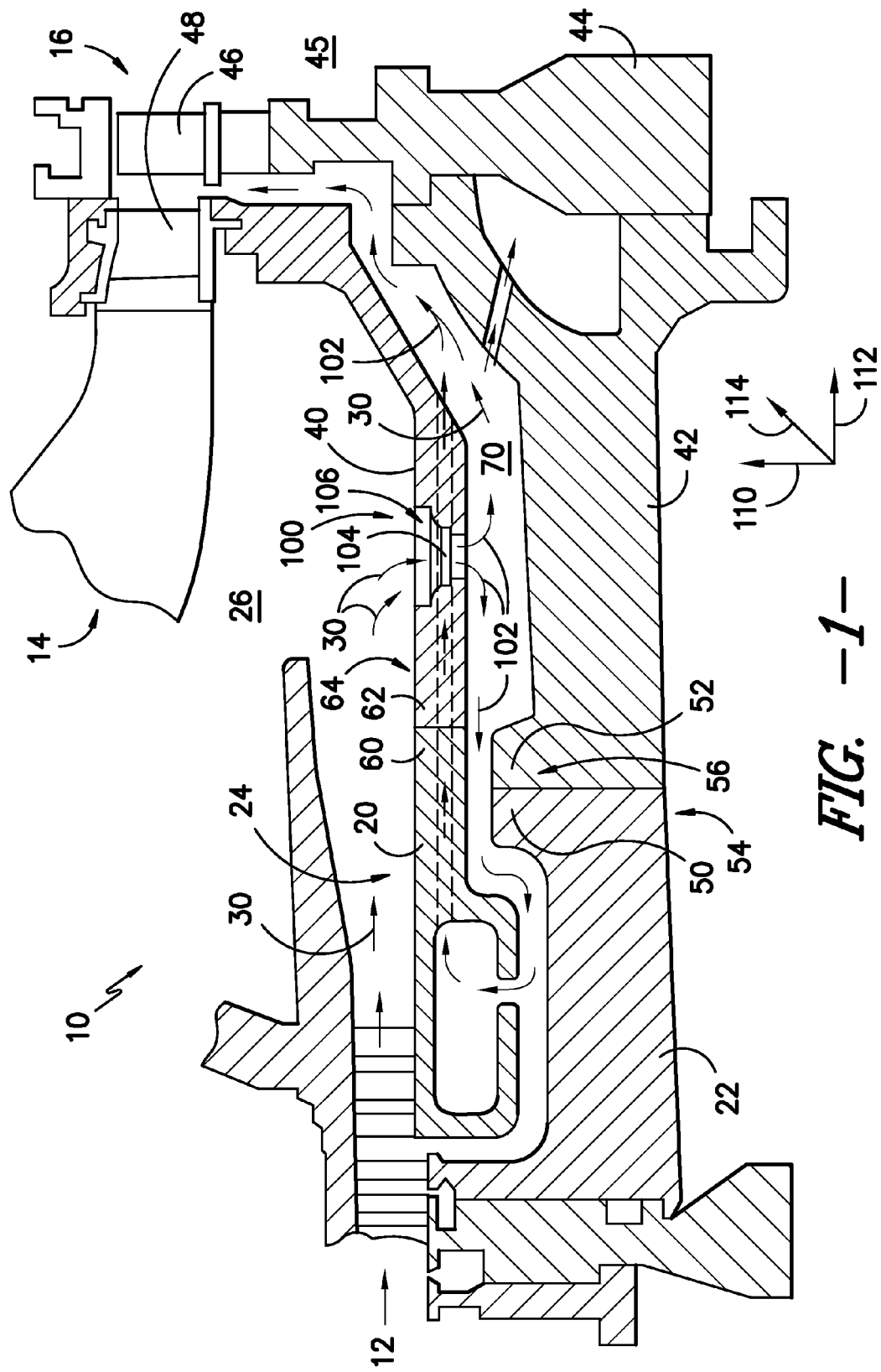
FIG. -1-

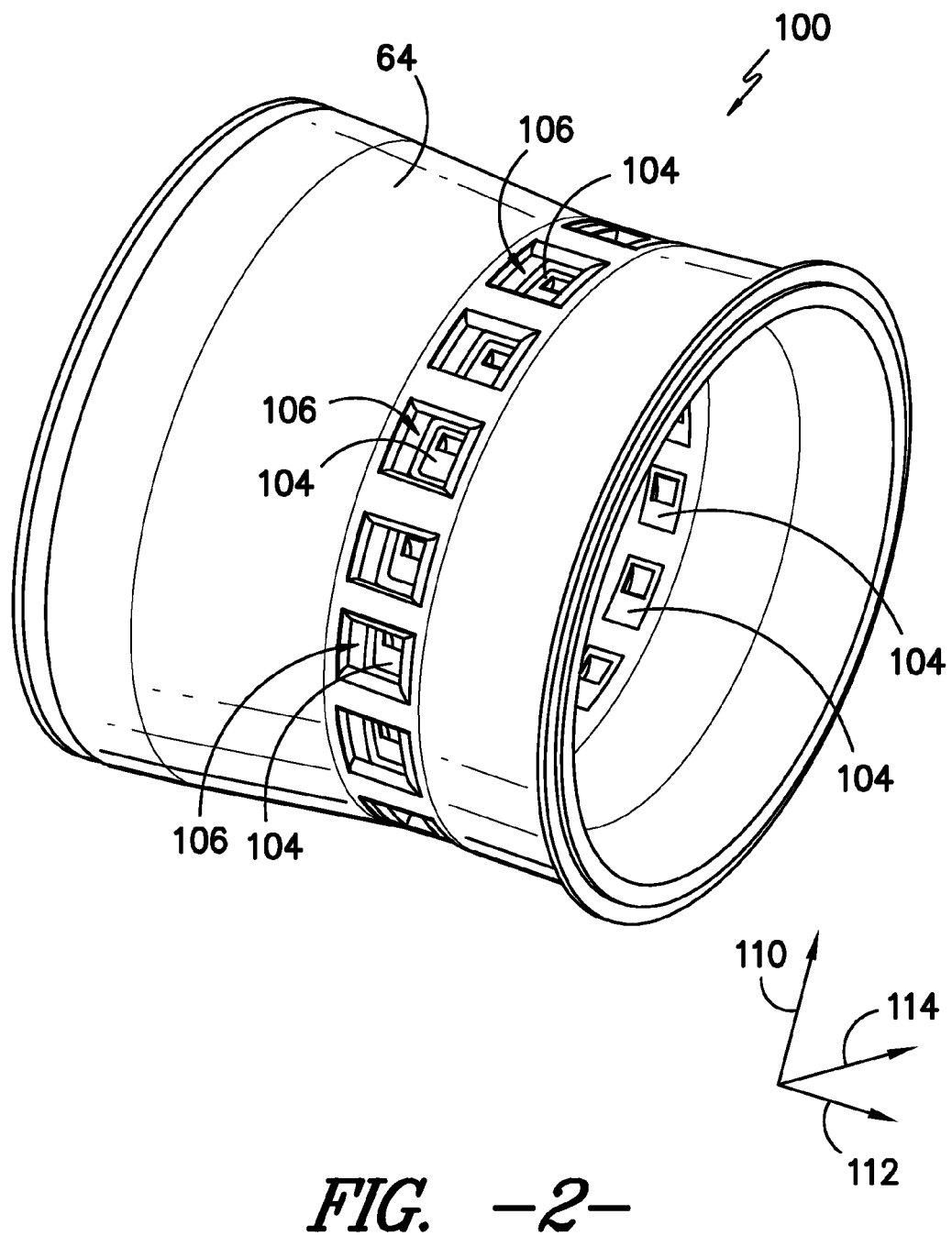
FIG. -2-

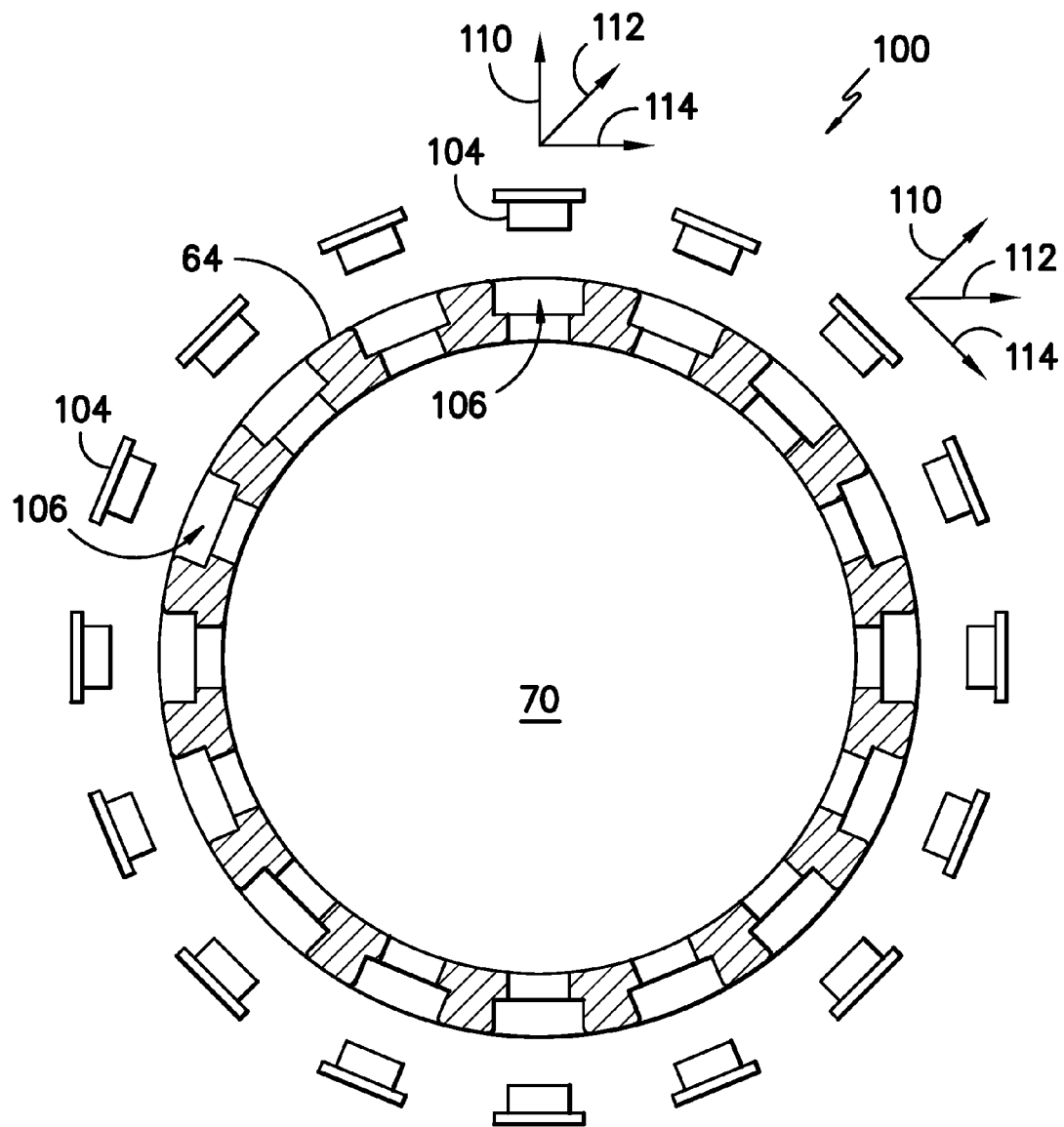
FIG. -3-

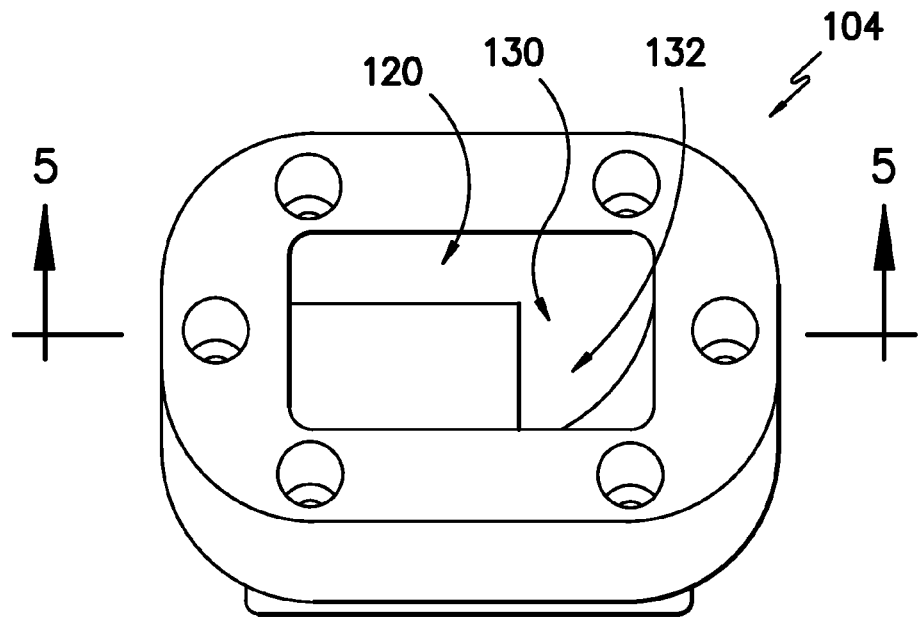
FIG. -4-
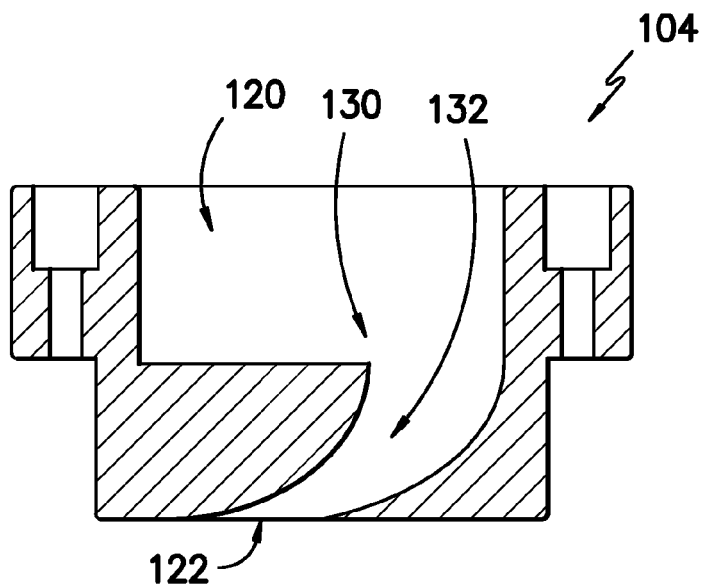
FIG. -5-

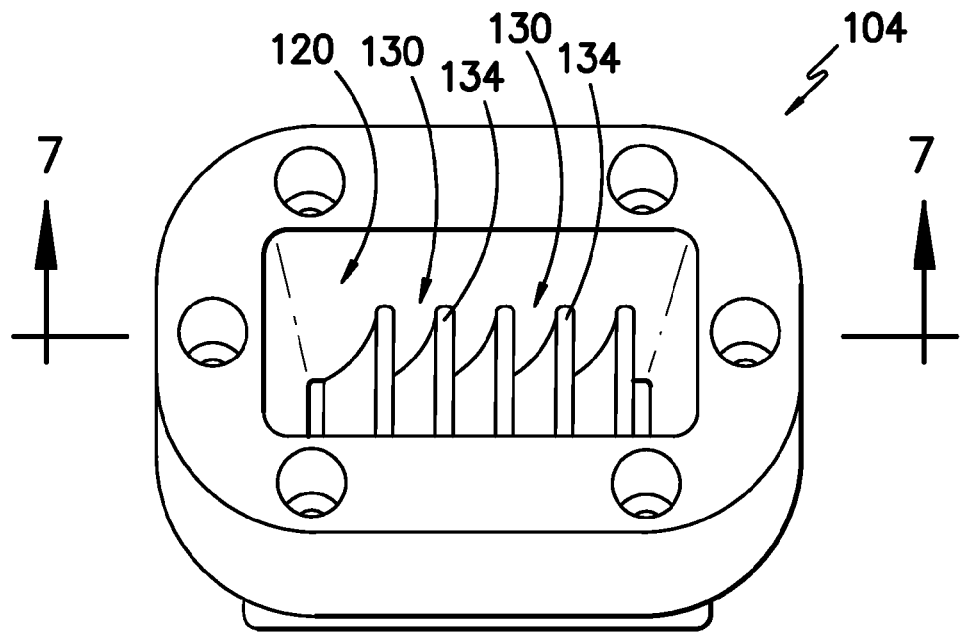
FIG. -6-
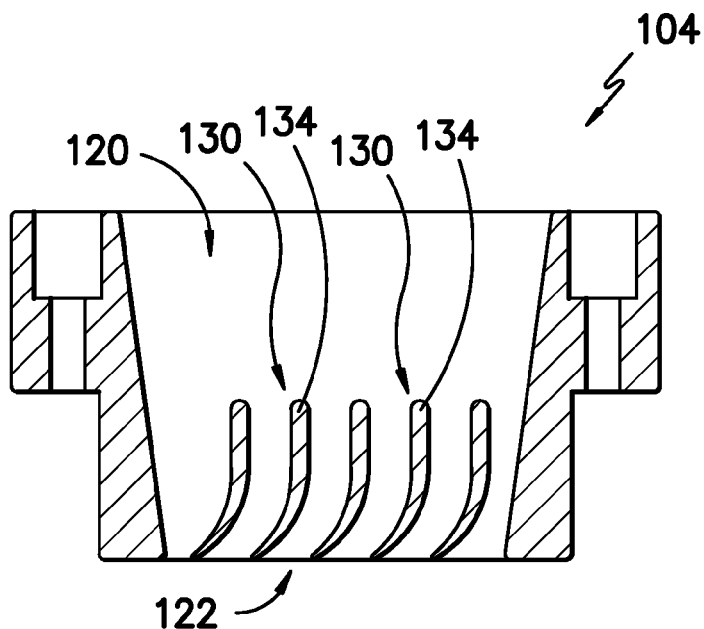
FIG. -7-

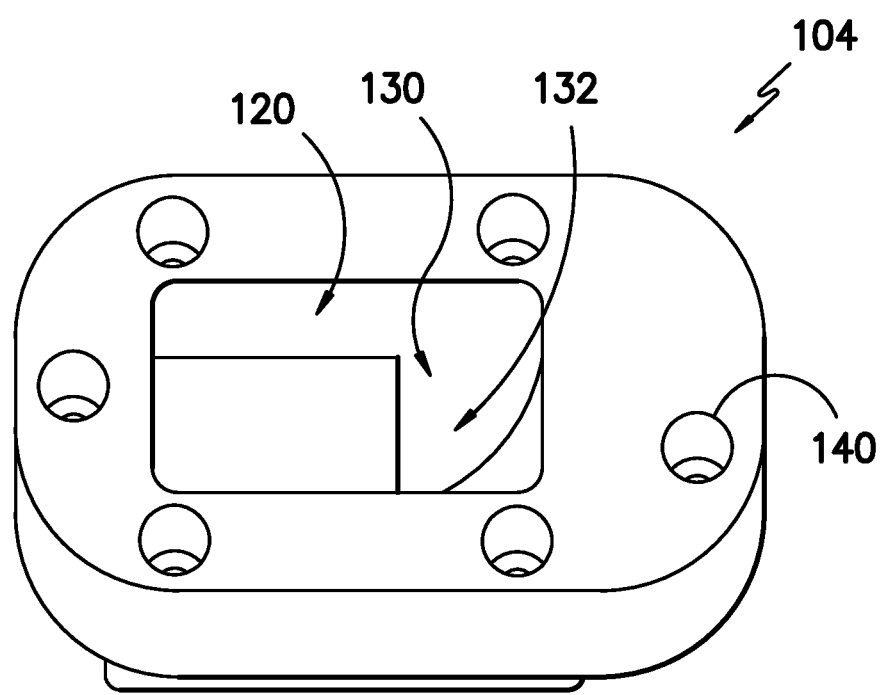
FIG. -8-

INDUCER FOR GAS TURBINE SYSTEM

FIELD OF THE INVENTION

The subject matter disclosed herein relates generally to gas turbine systems, and more particularly to inducers for supplying cooling medium to various components in a gas turbine system.

BACKGROUND OF THE INVENTION

Gas turbine systems are widely utilized in fields such as power generation. A conventional gas turbine system includes a compressor, a combustor, and a turbine. The compressor supplies compressed air to the combustor, wherein the compressed air is mixed with fuel and burned, generating a hot gas. This hot gas is supplied to the turbine, wherein energy is extracted from the hot gas to produce work.

During operation of the gas turbine system, various components and areas in the system are subjected to high temperature flows, which can cause the components and areas to fail. Since higher temperature flows generally result in increased performance, efficiency, and power output of the gas turbine system and are thus desired in the gas turbine system, the components and areas that are subjected to high temperature flows must be cooled to allow the gas turbine system to operate with flows at increased temperatures.

Examples of areas that should be cooled are the wheel space of the turbine section, which is the area of the turbine section surrounding the turbine rotor wheels, and the rotor joint, which is the joint between the compressor rotor and turbine rotor. For example, as the temperature in the wheel space increases due to increased temperature of flows through the wheel space or due to increased ambient temperatures external to the gas turbine system, components in the wheel space, such as rotor and bucket assembly components, may be subject to thermal expansion. This thermal expansion may eventually cause the various components to rub or otherwise contact each other, or may create excessive stresses in the components, potentially resulting in catastrophic damage to the components and to the gas turbine system. The rotor joint may similarly experience increased temperatures due to increased flow temperatures and/or ambient temperatures, and may thus be a life-limiting component of the system.

Various strategies are known in the art for cooling the wheel space and rotor joint to prevent damage to the gas turbine system. For example, many prior art strategies utilize inducers to flow a portion of the air from the compressor to cool the wheel space and rotor joint. The inducers accelerate the compressor discharge air flowing therethrough, reducing the temperature of the air before the air enters the wheel space and/or interacts with the rotor joint.

Typical prior art inducers are expensive, complicated devices. For example, many prior art inducers are cast into various portions of the gas turbine system between the compressor and the turbine, and include multiple layers of structure for accelerating air flows therethrough. These prior inducers have a variety of disadvantages. For example, as mentioned, the inducers may be expensive and complicated to manufacture. Additionally, because typical prior art inducers are cast, the inducers are not modifiable or tunable during system testing, validation, or commissioning, and the various components of the inducers are not easily repairable.

Thus, an improved inducer for a gas turbine system would be desired in the art. For example, an inducer that is relatively affordable and simple to manufacture and install in a gas turbine system would be desired. Additionally, an inducer that includes features that are modifiable or tunable, and that may further be easily repairable, would be advantageous.

BRIEF DESCRIPTION OF THE INVENTION

Aspects and advantages of the invention will be set forth in part in the following description, or may be obvious from the description, or may be learned through practice of the invention.

An inducer for a casing of a gas turbine system is disclosed. The inducer includes a plurality of orifices defined in the casing, the plurality of orifices disposed in an annular array about the casing, and a plurality of cartridges, each of the plurality of cartridges configured to mate with one of the plurality of orifices. Each of the plurality of cartridges includes an inlet and an outlet for flowing a cooling medium therethrough. The inducer further includes at least one flow modifier disposed in each of the plurality of cartridges for modifying the flow of the cooling medium through each of the plurality of cartridges. Each of the plurality of cartridges is independently removable from each of the plurality of orifices.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a side cutaway view of one embodiment of various components of a gas turbine system of the present disclosure;

FIG. 2 is a perspective view of an inducer according to one embodiment of the present disclosure;

FIG. 3 is a front exploded view of an inducer according to one embodiment of the present disclosure;

FIG. 4 is a perspective view of a cartridge according to one embodiment of the present disclosure;

FIG. 5 is a cross-sectional view of the cartridge of FIG. 4 taken along the lines 5-5;

FIG. 6 is a perspective view of a cartridge according to another embodiment of the present disclosure;

FIG. 7 is a cross-sectional view of the cartridge of FIG. 6 taken along the lines 7-7; and FIG. 8 is a perspective view of a cartridge according to yet another embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a cutaway view of one embodiment of various components of a gas turbine system 10 according to the present disclosure. The system 10 may include a compressor 12, a combustor 14, and a turbine 16. Further, the system 10 may include a plurality of compressors 12, combustors 14, and turbines 16. The compressor 12 and turbine 16 may be coupled together, as discussed below.

As shown, the compressor 12 generally includes a compressor stator component 20, a portion of which may be known as a compressor discharge casing, and an inner rotor component 22. The compressor 12 may further include a diffuser 24, which may be at least partially defined by the compressor stator component 20. A discharge plenum 26 may be provided adjacent to and in fluid communication with the diffuser 24. Air or, alternatively, any suitable gas, herein referred to as air flow 30, may travel through and be generally pressurized in the compressor 12, and the diffuser 24 and discharge plenum 26 may facilitate the channeling of the air flow 30 to the combustor 14. For example, after being compressed in the compressor 12, air flow 30 may flow through the diffuser 24 and be provided to the discharge plenum 26. The air flow 30 may then flow from the discharge plenum 26 to the combustor 14.

The turbine 16 generally includes a turbine stator component 40 and an inner rotor component 42. The rotor component 42 may be joined to a turbine wheel 44 or turbine wheels 44, which may be disposed in turbine wheel space 45. Various turbine rotor blades 46 may be mounted to the turbine wheels 44, while turbine stator blades 48 may be disposed in the turbine 12. The rotor blades 46 and stator blades 48 may generally form turbine stages. The adjoining ends of the compressor rotor 22 and the turbine rotor 42 may include various joining components, such as, for example, mating flanges 50 and 52, which may be bolted or otherwise joined to each other to form an inner rotary component or rotor 54. Rotor joint 56 may join the mating flanges 50 and 52. The adjoining ends of the compressor stator component 20 and the turbine stator component 40 may additionally include various joining components, such as, for example, mating flanges 60 and 62, which may be bolted or otherwise joined to each other to form an outer stationary casing 64 surrounding the rotor 54. Alternatively, the compressor stator component 20 and turbine stator component 40 may be formed from a singular component, such that no flanges or joint are necessary to form the casing 64. Thus, the compressor 12 and turbine 16 may include and define the rotor 54 and casing 64 therebetween.

The rotor 54 and casing 64 may further generally define a forward wheel space 70 therebetween. The forward wheel space 70 may generally be an upstream portion of the wheel space 45. The rotor joint 56 and wheel space 45 may be accessible through the forward wheel space 70.

In many cases, the wheel space 45 and/or the rotor joint 56 may need to be cooled. Thus, the present disclosure is further directed to an inducer 100. The inducer 100 may generally flow a portion of the air 30, herein referred to as cooling medium 102, therethrough to cool the wheel space 45 and/or the rotor joint 56. As discussed below, the inducer 100 may generally be associated with and disposed in the casing 64. Thus, the cooling medium 102 may flow from the discharge plenum 26 through the inducer 100, may be exhausted from the inducer 100 into the forward wheel space 70. The cooling medium 102 may then flow through the forward wheel space 70, interacting with and cooling the wheel space 45 and rotor joint 56.

As shown in FIGS. 2 and 3, the inducer 100 of the present disclosure may include a plurality of cartridges 104 and define a plurality of orifices 106. The orifices 106 may generally be defined in the casing 64 and disposed in an annular array about the casing 64. Each of the plurality of cartridges 104 may be configured to mate with one of the plurality of orifices 106. For example, each of the cartridges 104 may have an outer body shape and size that is suitable for mating with the inner shape and size of the mating orifice 106, such that the cartridge 104 may be placed into and mated with the orifice 106.

It should be understood that the orifices 106 and cartridges 104 may have any suitable size and shape. The size and shape of the orifices 106 and cartridges 104 as shown in FIGS. 1 through 8 are for illustrative purposes only, and are not intended to limit the present disclosure.

Any number of cartridges 104 and orifices 106 may be provided in an annular array about the casing 64. In some exemplary embodiments, the number of cartridges 104 and orifices 106 may equal the number of combustor cans (not shown) provided in the combustor 14. For example, a system 10 having sixteen combustor cans may include sixteen orifices 106 and sixteen cartridges 104 disposed in an annular array about the casing 64. In alternative embodiments, the inducer 100 may include fourteen, twelve, ten, eight, or six orifices 106 and cartridges 104. It should be understood, however, that the present disclosure is not limited to the above disclosed numbers of orifices 106 and cartridges 104. Rather, any number of orifices 106 and cartridges 104 equal to, greater than, or less than the number of combustor cans is within the scope and spirit of the present disclosure.

As shown, each of the orifices 106 may generally be defined in the casing 64. In some embodiments, the orifices 106 may be defined in the compressor stator component 20 of the casing 64, while in other embodiments, the orifices 106 may be defined in the turbine stator component 40 of the casing 64.

In general, each of the plurality of cartridges 104 may be independently removable from each of the plurality of orifices 106. For example, each orifice 106 may be independently removable from the orifice 106 with which the cartridge 104 is mated. Thus, any one of the cartridges 104 according to the present disclosure may be removable independently of the other cartridges 104 in the inducer 100. For example, each of the cartridges 104 may be independently fastened to the mating orifice 106 using any suitable fastening devices, such as nuts and bolts or screws. Advantageously, each cartridge 104 may be removable from the inducer 100 as desired, independently of the other cartridges 104, for repair or replacement. The inducer 100 of the present disclosure may thus allow for inexpensive and efficient repair and replacement of various components of the inducer 100. Further, the inducer 100 of the present disclosure may allow for tuning. For example, during testing, validation, or commissioning, cartridges 104 having various features and/or characteristics may be removed, replaced, and swapped to obtain various desired characteristics for the inducer 100 and system 10.

Further, in exemplary embodiments of the present disclosure as shown in FIGS. 1 through 3, the cartridges 104 may be removable through the exterior surface of the casing 64. Advantageously, this may allow the cartridges 104 to be removed without removing, adjusting, or otherwise disturbing other components of the system 10, such as other components of the casing 64 or components of the rotor 54. This ease of accessibility to the cartridges 104 may allow the cartridges to be quickly and efficiently repaired and replaced as desired or required.

In some exemplary embodiments, the cartridges 104 may be radially removable from the mating orifices 106. For example, as shown, the orifices 106 may be defined and annularly disposed in the casing 64 through the outer surface of the casing 64. Thus, to remove a cartridge 104 from an orifice 106 defined in the outer surface of the casing 64, the cartridge must be moved in a generally radial direction 110. In some alternative embodiments, the cartridges 104 may be longitudinally or tangentially removable, thus requiring movement in a generally longitudinal direction 112 or a generally tangential direction 114. Further, in some alternative embodiments, the cartridges 104 may be removable through movement in directions having any suitable radial, longitudinal, or tangential directional components.

It should be understood that the radial, longitudinal, and tangential directions 110, 112, and 114 are defined individually for each component of the system 10 as discussed herein, such as for each individual cartridge 104 and for the cooling medium 102 flowing through each cartridge 104 as discussed below. For example, the various directions are defined individually for each cartridge 104 with respect to the circumference defined by the outer surface of the casing 64, such that, for example, the radial direction 110 of removal of one cartridge 104 is different than the radial direction 110 of removal of another cartridge 104. FIG. 3 illustrates, for example, the various directions 110, 112, 114, as defined for various cartridges 104.

As shown in FIGS. 4 through 8, each of the cartridges 104 may include an inlet 120 and an outlet 122 for flowing cooling medium 102 through the cartridge 104. Thus, cooling medium 102 may enter the cartridge 104 from the discharge plenum 26 through the inlet 120 and be exhausted from the cartridge 104 into the forward wheel space 70 through the outlet 122. Each of the cartridges 104 may generally be configured to increase the flow velocity of the cooling medium 102 flowing therethrough. Thus, in some embodiments, the cross-sectional area of the inlet 120 of a cartridge 104 may be greater than the cross-sectional area of the outlet 122 of the cartridge 104. In these embodiments, the cooling medium 102 flowing through the cartridge 104 may accelerate through the cartridge 104 due, at least in part, to the differential in areas between the inlet 120 and the outlet 122. In alternative embodiments, however, the cross-sectional areas of the inlet 120 and outlet 122 of a cartridge 104 may be similar, or the cross-sectional area of the outlet 122 of a cartridge 104 may be greater than the cross-sectional area of the inlet 120 of the cartridge 104. In these embodiments, the cooling medium 102 flowing through the cartridge 104 may accelerate through the cartridge 104 due to the operation of other components of the cartridge 104, such as flow modifiers 130, as discussed below.

As mentioned, the inducer 100 of the present disclosure may further include flow modifiers 130 disposed in the cartridges 104. Each cartridge 104 may thus include at least one, or a plurality of, flow modifiers 130 therein. The flow modifiers 130 may be provided in the cartridges 104 for modifying the flow of cooling medium 102 through the cartridges 104. For example, the flow modifiers 130 may modify the direction of flow of the cooling medium 102 and/or may accelerate the cooling medium 102.

As shown in FIGS. 4, 5 and 8, in one embodiment the flow modifier 130 may be a passage 132 defined in the cartridge 104. The passage 132 may extend through at least a portion of the length of the cartridge 104 between the inlet 120 and the outlet 122. In some embodiments, the passage 132 may modify the direction of flow of the cooling medium 102, as discussed below. For example, in some embodiments, the passage 132 may have a vane-like or airfoil-like shape. In some embodiments, the passage 132 may be tapered. For example, the passage 132 may taper such that the end of the passage adjacent the outlet 122 has a smaller cross-sectional area than the end of the passage adjacent the inlet 120, such that cooling medium 102 flowing through the passage 132 is accelerated.

As shown in FIGS. 6 and 7, in another embodiment, the flow modifier 130 may be a vane 134 disposed in the cartridge 104. The vane 134 may extend through at least a portion of the length of the cartridge between the inlet 120 and the outlet 122. In general, the vane 134 may act to split the flow of cooling medium 102 into more than one flow as the cooling medium 102 flows past the vane 134. In some embodiments, the vane 134 may modify the direction of flow of the cooling medium 102, as discussed below. For example, in some embodiments, the vane 134 may have an airfoil-like shape. In some embodiments, the vane 134 may be tapered. For example, the vane 134 may taper such that the end of the vane 134 generally adjacent the inlet 120 has a larger cross-sectional area than the end of the vane 134 generally adjacent the outlet 122. Alternatively, the vane 134 may taper such that the end of the vane 134 generally adjacent the outlet 122 has a larger cross-sectional area than the end of the vane generally adjacent the inlet 122, such that cooling medium 102 flowing past the vane 134 in the cartridge 104 may be accelerated.

In exemplary embodiments, the direction of flow of the cooling medium 102 may be modified as the cooling medium 102 flows through the cartridges 104. For example, the flow modifiers 130, such as the passages 132 and/or the vanes 134, may modify the direction of flow of the cooling medium 102. The cooling medium 102 entering the cartridges 104 through the inlets 120 may, in some embodiments, be traveling with flow components in the generally longitudinal direction 112 and radial direction 110. The flow modifier 130 or flow modifiers 130 in each of the cartridges 104 may, in some embodiments, modify the flow of the cooling medium 102 such that the cooling medium 102 exhausted from the outlets 122 of the cartridges 104 has flow components that are modified from the flow components at the inlets 120. For example, the flow modifier 130 or flow modifiers 130 may add or eliminate a tangential direction 114 flow component, a longitudinal direction flow component 112, and/or a radial direction 110 flow component. Additionally or alternatively, the flow modifier 130 may modify, for example, the velocity of the flow of cooling medium 102 with respect to one or more flow components.

In one exemplary embodiment, for example, the cooling medium 102 exhausted from the cartridges 104 may flow with flow components in at least the generally radial direction 110 and the generally tangential direction 114. The flow modifiers 130 may thus be disposed and positioned within the cartridges 104 to modify the flow of cooling medium 102 to flow in at least the generally radial direction 110 and the generally tangential direction 114.

The cooling medium 102 exhausted from the cartridges 104 may further flow in the generally longitudinal direction 112 through the forward wheel space 70. For example, the cooling medium 102 may flow generally longitudinally towards the wheel space 45 or generally longitudinally towards the rotor joint 56, or a portion of the cooling medium 102 may flow generally longitudinally towards the wheel space 45 while another portion flows generally longitudinally towards the rotor joint 56. Various tubes and bore holes may be defined in the system 10, such as in the rotor 54 and the casing 64, to encourage these various longitudinal flow directions.

As discussed above, the cooling medium 102 may generally accelerate as it flows through the inducer 100. For example, as discussed, the cartridges 104 and/or the flow modifiers 130 therein may be configured to accelerate the flow of cooling medium 102. In exemplary embodiments, the inducer 100, and thus the cartridges 104 and/or the flow modifiers 130, may be designed to exhaust cooling medium 102 at certain velocities, and in particular to exhaust cooling medium 102 with flow components at certain velocities. For example, in one embodiment, the cooling medium 102 exhausted from the cartridges 104 may flow with a tangential direction 114 flow component that has a velocity approximately equal to or greater than the velocity of the rotor 54, such as approximately equal to or greater than the rotational velocity of the rotor 54.

It should be understood that the cartridges 104 of the present disclosure are not limited to having passages 132 or vanes 134 as disclosed herein. For example, in alternative embodiments, the flow modifier 130 may be a plate with a plurality of bore holes defined therethrough, a tube, a suitable protrusion, or any other suitable flow modifier 130. Thus, it should be understood that any flow modifier 130 for modifying the direction of flow of the cooling medium 102 and/or accelerating the cooling medium 102 as the cooling medium 102 flows through the cartridges 104 is within the scope and spirit of the present disclosure.

As shown in FIG. 8, the cartridge 104 according to the present disclosure may further include an alignment feature 140 or alignment features 140. In general, the alignment feature 140 may allow the cartridge 104 to mate with an orifice 106 in only one orientation. In other words, the alignment feature 140 is a "poka-yoke", or fail-safing or mistake-proofing, feature. As shown in FIG. 8, for example, the alignment feature 140 may be one of a plurality of bore holes configured to accommodate suitable fastening devices for fastening the cartridge 104 in the orifice 106. The alignment feature 140 may be offset from the remaining bore holes, as shown in FIG. 8, or may have, for example, a different size, orientation, or other feature. Thus, the alignment feature 140 allows the cartridge 104 to be positioned in only one orientation for proper mating and/or fastening of the cartridge 104 in the orifice 106. It should be understood, however, that the alignment feature 140 need not be a bore hole, but rather may be any suitable feature, such as a portion of the shape of the cartridge or a protrusion or indentation on the cartridge, that allows for mating of the cartridge 104 in the orifice 106 in only one orientation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An inducer for a casing of a gas turbine system, the inducer comprising:
   a plurality of orifices defined in the casing, the plurality of orifices disposed in an annular array about the casing;
   a plurality of cartridges, each of the plurality of cartridges configured to mate with one of the plurality of orifices, each of the plurality of cartridges including an inlet and an outlet for flowing a cooling medium therethrough; and
   at least one flow modifier disposed in each of the plurality of cartridges for modifying the flow of the cooling medium through each of the plurality of cartridges,
   wherein each of the plurality of cartridges is independently removable from each of the plurality of orifices, and
   wherein the at least one flow modifier is a vane disposed in each of the plurality of cartridges.

2. The inducer of claim 1, further comprising a plurality of flow modifiers.

3. The inducer of claim 1, wherein each of the plurality of cartridges is disposed in a turbine stator component of the casing.

4. The inducer of claim 1, wherein each of the plurality of cartridges is radially removable from the mating orifice.

5. The inducer of claim 1, wherein the cross-sectional area of the inlet of each of the plurality of cartridges is greater than the cross-sectional area of the outlet of each of the plurality of cartridges.

6. The inducer of claim 1, wherein the cooling medium flowing through each of the plurality of cartridges is exhausted from each of the plurality of cartridges flowing with a radial direction flow component and a tangential direction flow component.

7. The inducer of claim 6, wherein the cooling medium exhausted from each of the plurality of cartridges flows with a tangential direction flow component that has a velocity approximately equal to or greater than the velocity of a rotor of the gas turbine system.

8. The inducer of claim 6, wherein a portion of the cooling medium exhausted from each of the plurality of cartridges further flows with a longitudinal direction flow component towards a rotor joint of the gas turbine system, and wherein a portion of the cooling medium exhausted from each of the plurality of cartridges further flows with a longitudinal direction flow component towards a wheel space of the gas turbine system.

9. A gas turbine system, comprising:
   a compressor and a turbine, the compressor and turbine including a casing and a rotor therebetween; and
   an inducer, the inducer comprising:
      a plurality of orifices defined in the casing, the plurality of orifices disposed in an annular array about the casing;
      a plurality of cartridges, each of the plurality of cartridges configured to mate with one of the plurality of orifices, each of the plurality of cartridges including an inlet and an outlet for flowing a cooling medium therethrough; and
      at least one flow modifier disposed in each of the plurality of cartridges for modifying the flow of the cooling medium through each of the plurality of cartridges,
      wherein each of the plurality of cartridges is independently removable from each of the plurality of orifices.

10. The gas turbine system of claim 9, wherein the at least one flow modifier is a passage defined in each of the plurality of cartridges.

11. The gas turbine system of claim 9, wherein the at least one flow modifier is a vane disposed in each of the plurality of cartridges.

12. The gas turbine system of claim 9, further comprising a plurality of flow modifiers.

13. The gas turbine system of claim 9, wherein each of the orifices is defined in a turbine stator component of the casing.

14. The gas turbine system of claim 9, wherein each of the plurality of cartridges is radially removable from the mating orifice.

15. The gas turbine system of claim 9, wherein the cross-sectional area of the inlet of each of the plurality of cartridges is greater than the cross-sectional area of the outlet of each of the plurality of cartridges.

16. The gas turbine system of claim 9, wherein the cooling medium flowing through each of the plurality of cartridges is exhausted from each of the plurality of cartridges flowing with a radial direction flow component and a tangential direction flow component.

17. The gas turbine system of claim 16, wherein the cooling medium exhausted from each of the plurality of cartridges flows with a tangential direction flow component that has a velocity approximately equal to or greater than the velocity of the rotor.

18. The gas turbine system of claim 16, wherein a portion of the cooling medium exhausted from each of the plurality of cartridges further flows with a longitudinal direction flow component towards a rotor joint of the gas turbine system, and wherein a portion of the cooling medium exhausted from each of the plurality of cartridges further flows with a longitudinal direction flow component towards a wheel space of the gas turbine system.

19. An inducer for a casing of a gas turbine system, the inducer comprising:
   a plurality of orifices defined in the casing, the plurality of orifices disposed in an annular array about the casing;
   a plurality of cartridges, each of the plurality of cartridges configured to mate with one of the plurality of orifices, each of the plurality of cartridges including an inlet and an outlet for flowing a cooling medium therethrough; and
   at least one flow modifier disposed in each of the plurality of cartridges for modifying the flow of the cooling medium through each of the plurality of cartridges,
   wherein each of the plurality of cartridges is independently removable from each of the plurality of orifices,
   wherein the cooling medium flowing through each of the plurality of cartridges is exhausted from each of the plurality of cartridges flowing with a radial direction flow component and a tangential direction flow component, and
   wherein the cooling medium exhausted from each of the plurality of cartridges flows with a tangential direction flow component that has a velocity approximately equal to or greater than the velocity of a rotor of the gas turbine system.

20. The inducer of claim 19, wherein the at least one flow modifier is a passage defined in each of the plurality of cartridges.

* * * * *